United States Patent Office 3,346,330
Patented Oct. 10, 1967

3,346,330
PROCESS OF EXTRACTION OF HAFNIUM
Alain de Calmes, Paris, Henri Humeau, Trosly-Breuil, and Alfred Lecocq, Saint-Maur-des-Fosses, France, assignors to Commissariat à l'Energie Atomique, Paris, France
No Drawing. Filed Dec. 12, 1962, Ser. No. 243,984
Claims priority, application France, Dec. 27, 1961, 883,075
9 Claims. (Cl. 23—23)

The present invention concerns a process of extraction of hafnium from an aqueous solution containing hafnium, zirconium and impurities.

An important, but not exclusive, application of the invention concerns the preparation of hafnium oxide of nuclear purity, starting from by-products of the manufacture of zirconium oxide by the method described in United States Patent No. 2,757,081. This method consists in selectively extracting the zirconium in solution in an aqueous acid phase with an organic solvent which is immiscible with the aqueous phase. The organic and aqueous phases circulate in counter-current and the zirconium passes into the solvent, while the aqueous phase retains almost all the hafnium and the impurities as well as a small fraction of the zirconium.

The organic solvent chosen is usually tributyl phosphate (referred to below as TBP) alone or accompanied by a diluent such as white spirit. The residual aqueous phase contains, within certain limits of acid concentration, almost all the hafnium and the impurities essentially consisting of silicon, iron, calcium, magnesium, aluminium, phosphorous, titanium and sodium, in combination. The hafnium content of this solution, expressed as the number of hafnium atoms with respect to the number of zirconium and hafnium atoms, is about 20%.

It seems possible in theory to contact this solution with a solvent of the same kind as that used for the extraction of zirconium, under different acidity conditions, in order to extract hafnium. In fact, the emulsifying agents contained in the solution (mainly silica) rapidly cause total consumption of the material used for the extraction (columns or mixer-decanters). The operation thus appears to be incapable of realisation in practice.

This invention contemplates the provision of a process of extraction of hafnium which includes a preliminary stage of elimination of the major part of the impurities. The invention also includes a process comprising, in a second stage, the extraction of the purified hafnium from the solution thus deprived of the major part of its impurities.

The process according to the invention includes a preliminary purification phase, comprising the complete emulsification of an aqueous acid solution containing hafnium with an organic solvent, such as mono-, di- or tributyl phosphate, and the separation after standing and decantation of the purified organic solution containing almost all the hafnium and all the zirconium, the impurities remaining in aqueous solution and in the sludge formed and the remainder of the hafnium being contained in the aqueous solution.

In other words, the process of the invention dispenses with the problem of the formation of emulsions by the impurities during the later stages and allows a preliminary purification to be carried out, before extraction of the hafnium from its aqueous solutions by complete emulsification of such aqueous solutions with an organic solvent, which allows separation, after standing and decantation, of substantially all the hafnium and all the zirconium in the form of a highly purified organic solution. Whereas known processes seek by complex and more or less efficacious means to avoid emulsification and sludge-formation, the process of the invention causes these phenomena briefly and in a localised manner and puts them to use advantageously.

The invention also includes a process comprising the hafnium enrichment stage, in a single operation, of a purified organic solution of hafnium and zirconium by circulation of the purified organic solution containing the hafnium and zirconium in counter-current with an aqueous phase of suitable acidity in the presence of fresh organic solvent which gives selective extraction of the zirconium, prior to action upon the organic solution treated.

This process allows the extraction of hafnium to be carried out, in a single operation and at industrial concentrations, without the undesirable formation of an emulsion and corresponding blockage of columns or mixer-decanters. This emulsion formation renders inapplicable, at industrial concentrations, the method of separation of hafnium which consists in a simple separation by counter-current circulation of the organic solution and the aqueous phase from the hafnium extraction, because it prohibits an organic/aqueous ratio lower than 3. The hafnium content, as previously defined, would then be limited to a value from 60 to 80% depending upon the initial concentration of the organic solution.

The invention will be better understood from the following description of a typical process and an example of the application of this process. The aqueous solution of hafnium and zirconium, if obtained as the residual solution from a zirconium extractor, contains a hafnium content of about 20%.

This solution is concentrated and treated to eliminate the major part of its impurities. The solution is acidified and then shaken for a short time with an organic solvent, suitable acids and solvents being given below. The emulsion formed is gradually decanted and separates into two clear phases separated by a sludge inter-layer. The major part of the impurities passes into the sludge, a small part (principally comprising the insoluble impurities) passes into the aqueous phase and the remainder into the organic phase. The upper organic phase contains almost all the hafnium and all the zirconium. The lower aqueous phase contains the rest of the hafnium and can be recycled to a previous stage in the process. The sludge is rejected after recovery of the solvent. This operation can be carried out at ordinary temperature with certain acids (particularly nitric acid) while others require the use of heat.

The degree of acidity chosen should be sufficiently high for the average distribution co-efficient between the phases to be much higher than 1 and preferably about 3.8 for hafnium and zirconium, if the major part of the former and almost all the latter are to remain in solution in the organic phase. In contrast, the partition co-efficient remains low for the impurities, which allows them to be eliminated.

The operation outlined above can be applied to residual aqueous solutions containing per litre 4 to 60 g. of $ZrO_2$ and 1 to 20 g. of $HfO_2$, apart from the usual impurities. These solutions are given an acidity corresponding to a normality greater than 7 and generally about 9–10 by means of a suitable and preferably mineral acid. Nitric acid is usually used because it gives a particularly high partition co-efficient, but most acids having soluble zirconium and hafnium salts can be used (hydrochloric acid, sulphuric acid, etc.).

The upper limit of the normality is governed by two criteria:

An aqueous solution of too high an acidity is likely to attack the organic solvent;

On the other hand commercial acids are diluted, ordinary nitric acid having a normality of 13 N.

Among the organic solvents which can be used, TBP diluted with a mixture of petroleum hydrocarbons, such as white spirit, gives best results. Other solvents which can be used include trioctyl phosphate, mono-, di- or tributyl phosphate, butyl phenyl phosphate, butyl acetate and isoamyl acetate. In the case of TBP, a quantity of solvent is used which corresponds to at least 1.5 times the volume of the solution to be treated.

Agitation generally for several minutes can be provided in any suitable way, preferably in an apparatus located ahead of the extractors themselves, for example, in a simple vessel provided with a stirrer. The duration of decantation is generally several hours.

The organic phase obtained contains hafnium and zirconium but only minimum proportions of impurities. It constitutes the purified starting solution for enrichment in hafnium.

The enrichment process, in a single extraction operation using an aqueous phase in a single column, allows a hafnium content exceeding 95% to be obtained and one as high as 99.5% with suitable industrial parties. In contrast, the extraction processes used at present do not yield a figure better than 75% because, at industrial concentrations and the acidity necessary, any organic/aqueous ratio lower than 3 causes the formation of emulsions.

The invention proposes, after obtaining a 75% content in the aqueous phase, to effect selective extraction of zirconium by fresh organic solvent in the later stages.

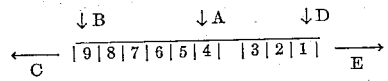

The above diagram shows by way of example, a nine-stage column for carrying out the invention. The organic phase is introduced at A and the aqueous phase is introduced at B. The acidity of the aqueous phase should be such that the partition co-efficients are materially different for hafnium and zirconium. For a nitric acid solution, a normality of about 5 N is usually used. The organic phase decreased in hafnium leaves at C. The aqueous phase at A has a hafnium content not exceeding 75% and its subsequent enrichment takes place in stages 3–1 by counter-current circulation of fresh organic solvent introduced at D and selective entrainment of zirconium under the acidity conditions chosen. The aqueous solution leaving at E can attain a high content (depending upon the number of stages, the input at D and so on), which can exceed 99%.

The first enrichment stage, in stages 4–9, is preferably carried out with an input ratio of between 4 and 7 between the organic phase and the aqueous phase, constituted by the water added with the nitric acid. The second stage is preferably carried out with an organic/aqueous input ratio of between 2 and 4.

The hafnium contained in the enriched aqueous solution is then precipitated, in known manner, in the form of $HfO_2$.

A numerical example of the use of the invention is given below, by way of illustration only.

The initial aqueous solution, given a normality of 9 by the addition of nitric acid ($HNC_3$), contained per litre 44 g. of zirconium oxide, $ZrO_2$, and 11 g. of hafnium oxide, $HfO_2$, namely a hafnium content of 20%. The following impurities per 100 g. of $HfO_2$ were also present:

| | Grams |
|---|---|
| $SiO_2$ | 19.10 |
| $CaO$ | 3.46 |
| $Fe_2O_3$ | 4.02 |
| $TiO_2$ | 7.72 |
| $Al_2O_3$ | 1.34 |
| $Na_2O$ | 80.30 |
| $P_2O_5$ | 8.03 |

This solution was contacted with three times its own volume of a solvent constituted by 1.5 vols. of TBP and 1.5 vols. of white spirit of sp. gr. 0.78. Agitation lasted for four minutes; the mixture was left to decant for several hours. The organic phase, separated from the sludge formed, then contained 90% of the hafnium and 98% of the zirconium initially present in the starting solution, as well as the following impurities per 100 g. of $HfO_2$:

| | | |
|---|---|---|
| $SiO_2$ | grams | 0.22 |
| $CaO$ | do | 0.20 |
| $Fe_2O_3$ | do | 0.03 |
| $TiO_2$ | do | 6.60 |
| $Al_2O_3$ | do | 0.09 |
| $Na_2O$ | do | 0.06 |
| B | | Trace |
| Mg | | Trace |

Hafnium enrichment by aqueous phase extraction was then effected in a column. The solvent was introduced at A and the fresh solvent (a 50% solution of TBP in white spirit) at D, each at a rate of 94 l./h. The solvent deprived of hafnium was recovered at C. The aqueous phase, constituted by the water added with the nitric acid to maintain a normality of 5 to 5.3, was introduced at B, in the ninth stage, at the rate of 30 l./h., and was withdrawn at E at a rate of 30 l./h.

In the process outlined above, three supplementary stages 10–12 were added to the column, to recover the zirconium from the organic solvent.

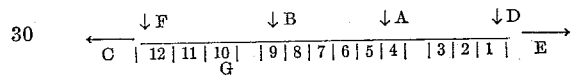

A supply of dimineralised water of 30 l./h. was introduced at F into stage 12 and withdrawn at G. This water took up zirconium in stages 12 to 10, while the deprived organic solvent withdrawn at C was optionally returned to the column.

During the first stage (exchange between the acidified water and the solvent, from stage 9 to intermediate stage 4 into which the solvent is introduced), the hafnium enrichment can attain 70 to 75%. During the second stage (exchange between the aqueous phase enriched to 70 to 75% in hafnium and the fresh solvent, from intermediate stage 3 to stage 1), the ratio Hf:Hf+Zr attains approximately 99 to 99.5%. In the first stage, the input ratio of solvent/aqeuous phase is 3:1; in the second, the ratio of fresh solvent/aqueous phase is 3.1.

An aqueous solution rich in hafnium and deprived of substantially all the initial impurities is thus obtained. It is always desirable, if very pure hafnium is required, to eliminate titanium by a known method, for example, chemically (precipitation with mandelic acid), by ion exchange or by distillation. A hafnium content of 99% is finally obtained, containing the following impurities (by weight):

| | P.p.m. |
|---|---|
| B | About 1 |
| P (from the TBF) | About 500 |
| Ti | <100 |
| Al | About 50 |
| Ca | <50 |
| Na | <200 |
| Fe | <300 |
| Mg | About 10 |
| Si | <50 |

What is claimed is:

1. A process for separation of hafnium from zirconium and impurities, comprising completely emulsifying an aqeuous acid solution containing hafnium, zirconium and impurities with an organic solvent, the acidity of the acid solution being greater than 7 normal but not so great as to attack the organic solvent, allowing the emulsion to separate into an upper organic phase containing a substantial amount of the hafnium and zirconium, a lower aqueous phase and sludge innerlayer, the aqueuos phase and the sludge innerlayer containing most of the impurities, separating the organic phase containing the hafnium and zirconium from the phases containing the impurities and passing said organic phase countercurrent to an aqeuous acid solution having an acidity such that the partition co-efficients are different for hafnium and zirconium, whereby the hafnium passes into the aqueous acid phase and most of the zirconium remains in the organic phase.

2. The process of claim 1 wherein the organic phase containing zirconium and hafnium is passed in countercurrent contact to the aqueous acid solution along with fresh organic solvent, said fresh organic solvent being introduced into the aqueous acid phase at a stage after introduction of the organic phase containing the hafnium and zirconium, whereby any zirconium contained in the said aqueous acid phase is extracted by said fresh organic solvent.

3. A process according to claim 1, in which the initial aqeuous acid solution is first acidified to a normality of about 9–10 with a mineral acid and is then shaken with the organic solvent to form the emulsion, which is allowed to stand for a time sufficient to form an upper organic layer containing the major part of the hafnium and substantially all of the zirconium, a lower aqueous layer containing the remainder of the hafnium and a sludge innerlayer, the upper layer then being separated for recovery of the hafnium.

4. A process according to claim 3, in which the aqueous layer containing the remainder of the hafnium is recycled to an earlier stage in the process.

5. A process according to claim 1, in which the organic solvent comprises tributyl phosphate.

6. A process according to claim 5, in which the organic solvent comprises tributyl phosphate diluted with white spirit.

7. A process according to claim 1, in which the organic solvent for preparation of the emulsion is used in a ratio of three volumes per volume of aqueous solution.

8. A process according to claim 2, wherein the hafnium separation from the purified organic solution of hafnium and zirconium comprises a one pass countercurrent contact of such solution with the aqueous acid phase in the presence of the fresh organic solvent.

9. A process according to claim 2, in which the hafnium separation comprises the countercurrent contact of the organic solution with the aqueous phase in a ratio of from 4 to 7 and the fresh organic solvent is added in a ratio of from 2 to 4.

References Cited
UNITED STATES PATENTS

| | | | |
|---|---|---|---|
| 2,757,081 | 7/1956 | Hure et al. | 23—22 X |
| 2,923,607 | 2/1960 | Peppard | 23—23 X |
| 2,938,769 | 5/1960 | Overholser et al. | 23—23 |
| 3,006,719 | 10/1961 | Miller | 23—22 |
| 3,117,833 | 1/1964 | Pierret | 23—22 X |

MILTON WEISSMAN, *Primary Examiner.*

OSCAR R. VERTIZ, *Examiner.*

H. T. CARTER, *Assistant Examiner.*